| United States Patent [19] | [11] Patent Number: 4,810,757 |
| Hardiman et al. | [45] Date of Patent: Mar. 7, 1989 |

[54] ALLYLOXY ACTIVATED SURFACE COATINGS

[75] Inventors: Christopher J. Hardiman, Belchertown; Gary R. Bowers, Westfield, both of Mass.

[73] Assignee: Monsanto Company, St. Louis, Mo.

[21] Appl. No.: 49,753

[22] Filed: May 13, 1987

[51] Int. Cl.[4] ..................... C08F 299/06; C08F 265/06
[52] U.S. Cl. .................... 525/306; 427/385.5; 525/10; 525/298; 525/278; 525/302; 525/303; 526/301
[58] Field of Search .................. 526/301, 328.6, 328.5; 525/10, 278, 298, 306, 302, 303

[56] References Cited

U.S. PATENT DOCUMENTS 3,700,648 10/1972 Hirooka ............................ 526/105
4,082,710 4/1978 Vrancken ......................... 526/312
4,590,101 5/1986 Knapczyk ......................... 427/350

FOREIGN PATENT DOCUMENTS 45688 4/1977 Japan .

OTHER PUBLICATIONS

Krylov et al.; Kinet. Katal. 24(1) 47–52; CA98(19): 160022k.
Schnurpfeil; Z. Chem., 21(9), 327–8; CA96(1): 6235j.
Rothe et al.; J. Prakt. Chem., 324(4), 596–608; CA98(5): 34172w.
Boeden et al.; J. Prakt. Chem., 324(4), 526–36; CA98(5): 34288p.
Ivanov et al.; React. Kinet. Catal. Lett., 10(1), 31–6; CA90(23): 186060f.
Kaeriyama et al.; Makromolekulare Chemie, 167(1973), 129–137.

*Primary Examiner*—Christopher Henderson
*Attorney, Agent, or Firm*—William J. Farrington; Thomas E. Kelley

[57] ABSTRACT

Metal drier moderated to provide compositions of extended pot life by at least one molybdenum compound. Coating compositions of free radical polymerizable compounds and moderated metal drier exhibit lower propensity to yellowing.

7 Claims, No Drawings

ALLYLOXY ACTIVATED SURFACE COATINGS

This invention relates to allyloxy activated surface coatings of free-radical compounds, especially to such coatings cured with metal drier catalysts that are moderated by soluble molybdenum compounds.

Surface coatings of free radical-polymerizable compounds are preferably cured with an activator or crosslinker to provide a durable coating. Such curing is often promoted by use of a metal drier, e.g. a cobalt or manganese compound, and a free radical initiator, e.g. a peroxide. Such metal driers enhance the curing by allowing rapid (e.g. less than about 1 hour) curing to tough, tack free films at low temperatures (e.g. less than 100° C). A disadvantage is that coating compositions comprising desirable metal driers such as cobalt compounds and peroxides have undesirably short pot life, e.g. often less than about an hour or so. As disclosed in copending applications Ser. Nos. 946,740 and 946,742, both filed Dec. 24, 1986, extended pot life, e.g. at least about 8 hours or more, has been provided with coating compositions comprising a temporary catalyst inhibitor, e.g. a strong fugitive acid such as trifluoroacetic acid.

Such fugitive acid stabilized compositions provide tough, durable coatings. In certain applications, e.g. when applied as clear coatings over white surfaces or as white pigmented coatings, such coatings which retain the dispersed metal drier are prone to undesirable discoloration, e.g. yellowing. The generation of color can be reduced by replacing the cobalt compound which allows curing at moderate temperature, e.g. at about 50° C., with a less active metal drier, e.g. a molybdenum compound, which requires undesirably higher temperatures, e.g. about 100° C., and /or longer time to effect curing.

An object of this invention is to provide a moderated metal drier catalyst which exhibits the desirable characteristics of cobalt compounds such as rapid cure at low temperature, but which has a substantially extended pot life and provides coatings with enhanced resistance to discoloration.

SUMMARY OF THE INVENTION

It has been discovered that certain soluble molybdenum compounds can be utilized to attenuate the activity of metal driers in coating compositions to provide extended pot life and discoloration-resistant coatings. Accordingly, this invention provides novel free radical polymerization catalysts comprising metal driers and at least one of said compounds which have a solubility in methyl ethyl ketone, ethanol or toluene of at least 0.1% by weight. This invention also provides coating compositions comprising a free radical-polymerizable compond, an allyloxy compound, and a free radical initiator together with such catalyst which provides the composition with an extended pot life and allows the composition to be cured to tough coatings that are resistant to discoloration. Also provided are methods of making and using such catalysts and coating compositions.

DESCRIPTION OF PREFERRED EMBODIMENTS

The free radical polymerization catalyst of this invention comprises a metal drier and at least one molybdenum compound wherein said compound has a solubility in methyl ethyl ketone, ethanol or toluene of at least 0.1% by weight. Metal driers are well known in the coating industry and preferred metal driers often include cobalt and manganese compounds, e.g. fatty acid salts of such metals. In many cases preferred metal driers include cobaltous acetate, citrate, acetyl-acetonate, 2-ethylhexanoate, and the like. Metal driers are typically provided in coating compositions at catalytically effective levels of from about 0.001% to about 1% by weight.

In the catalyst of this invention the metal drier is effectively moderated to provide coating compositions of enhanced pot life by the interaction of a soluble molybdenum compound, preferably a molybdenum (VI) compound. Such compounds are desirably soluble in a solvent miscible with the coating composition, e.g. methyl ethyl ketone, ethanol or toluene. Preferred molybdenum compounds comprise molybdenum dioxide dichloride, phosphomolybdic acid, or more preferably molybdenum dioxide bis(2,4-pentanedione). The 2,4-pentanedione ligand is commonly called acetyl-acetonoate and is hereinafter referred to by its common abbreviation, i.e. "Ac—Ac". When used in coating compositions enhanced pot life and discoloration resistance is achieved when the molar ratio of molybdenum to metal of the drier, e.g. cobalt, is about 0.1 to 10, for instance about equimolar ratios. Although it has been found that halogenated compounds are among those useful in extending pot life and reducing the tendency toward discoloration, e.g. by action of the metal drier, it is nonetheless preferred to avoid such halogenated compounds which may be involved in different discoloration mechanisms, e.g. photo active discoloration.

The catalysts of this invention can be prepared by mixing solutions of metal drier and molybdenum compound. When such catalysts are provided in coating compositions, it is generally desirable to add the catalyst as the last component of the composition. When the moderated catalyst has not been previously prepared, it is desirable to first add the molybdenum compound to the coating composition, followed by the metal drier to minimize any premature curing by extremely active metal drier such as cobalt compounds.

The moderated catalyst of this invention can be used to promote the free radical polymerization of a variety of compositions, e.g. coating compositions comprising free radical polymerizable compounds and allyloxy compounds, including compositions comprising free radical initiators.

Such free radical initiator can comprise peroxides such as t-butyl hydroperoxide, cumene peroxide, methyl ethyl ketone peroxide, lauroyl peroxide, benzoyl peroxide, azo-bis(isobutyronitrile) and the like and mixtures thereof.

The free radical-polymerizable compound useful in the compositions and methods of this invention can be an unsaturated monomer or oligomer or mixture of monomers and oligomers. The nature of the compound is not critical so long as it is activated towards free radical polymerization via the double bonds when it is brought into reactive admixture with a metal drier and/or free-radical initiator. Such compounds include drying oils such as castor, linseed, oticica, safflower, soybean, sunflower, tung and certain fish oils; acrylic monomers; vinyl monomers such as styrenic monomers, vinyl ethers, vinyl esters, vinyl imides, vinyl amides; maleates and fumarates. In many cases it is preferred that such compounds be selected from acrylyl monomers or oligomers; such preferred compounds desirably having a number average molecular weight less than about 4000 and contain from 1 to about 10 unsaturated groups per molecule. A particularly preferred group of acrylyl monomers is represented by the structure:

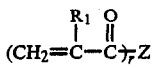

where $R_1$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate of a number average molecular weight less than about 4000 containing a hydrocarbon, ester, amide, ether or urethane backbone. Such monomers may be obtained by reaction of acryloyl, methacryloyl or ethacryloyl chloride with an alcohol, a polyol, an amine, or a polyamine or by the reaction of acrylic acid, methacrylic acid or ethacrylic acid with an epoxide, a polyepoxide, an isocyanate, or a polyisocyanate, or by reaction of a hydroxyalkyl acrylate, methacrylate or ethacrylate with a carboxylic acid, polycarboxylic acid, an epoxide, a polyepoxide, an isocyanate, or a polyisocyanate. Such monomers include methyl acrylate, methyl methacrylate, butyl acrylate, 1,3-butylene glycol diacrylate, 1,6-hexanediol diacrylate, the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, and the polyacryloyl monomers prepared by reacting isocyanate capped polyethers and isocyanate capped polyesters of molecular weight up to 4000 with hydroxyethyl acrylate.

The coating compositions and methods of this invention also comprise an allyloxy compound which may tend to activate the cure process. Certain allyloxy compounds can advantageously serve as crosslinking agents to provide desirable cured film properties. Suitable allyloxy compounds are selected from β,γ-unsaturated ethers having at least one α-hydrogen atom in which the allyloxy group may be represented by the following formula:

The β,γ-unsaturated ether compound has an equivalency less than about 300, based upon the number of β,γ-unsaturated ether groups having an α-hydrogen, a molecular weight less than about 10,000, and has from 1 to 60 β,γ-unsaturated ether groups.

The allyloxy compounds are generally aliphatic in character. Alternatively, compounds having β,γ-unsaturation with a triple bond as in propargyl methyl ether, dipropargyl ether, tripropargyl trimethylol propane, or hexapropargyl sorbitol may be used and are considered equivalent to allyloxy compounds for purposes of this invention. Exemplary of allyloxy compounds useful in the compositions of this invention are the following: methyl allyl ether, methyl methallyl ether, butyl allyl ether, diallyl ether, allyl methallyl ether, dicrotyl ether di-(2-chloro-2-propenyl) ether, di-(2-phenyl-2-propenyl) ether, di(1-methyl-2-propenyl) ether, 1-phenyl-2-propenyl ether, di-(3-phenyl-2-propenyl) ether, di-(2-isopropyl-2-propenyl) ether, 1,4-diallyl oxy-2-butene, 1,4-diallyloxy-2-butyne, 1,6-diallyl oxyhexane, 1,4-dimethallyloxypentane, 2,5-dimethoxy-2,5-dihydrofuran, allyl glycidyl ether; allyloxy compounds prepared from the ionic polymerization of allyloxyalkyl acrylates, methacrylates, acrylamides or the allyloxy derivatives of vinyl ethers, such as poly(allyloxyethylmethacrylate) and poly(allyl vinyl ether); allyloxy compounds wherein the allyloxy group forms part of an oligomeric backbone, such as poly-(2-buten-1,4-diol) or 2,5-poly(2,5-dihydrofuran).

Preferred allyloxy compounds may be selected from the group of polyethers and polyesters represented by the structural formula:

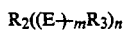

where $R_2$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

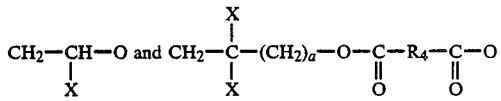

where the X groups are independently selected from the group consisting of H, $CH_3$, $C_2H_5$ and $CH_2OCH_2Y$, Y being selected from the group consisting of $CH=CH_2$, $H_3C-C=CH_2$, and $H_5C_2-C=CH_2$, where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60. It is anticipated that any of the hydrogens in Y, except at least one alpha to the ether group, can be replaced with a lower alkyl without substantially affecting the invention and that the resulting compounds would be equivalent to those according to the invention. Polyethers containing an allyloxy group may be prepared by ionic polymerization of allyl glycidyl ether or mixtures of allyl glycidyl ether and the appropriate alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the monoallyl ether of trimethylolethane, the monoallylether of trimethylolpropane, the monoallyl ether of pentaerythritol, the diallyl ether of pentaerythritol and similar mono and polyallyl ethers of polyols. Allyl glycidyl ether or methallyl glycidyl ether may also be substituted for the monoallyl ether of glycerol.

Another group of preferred allyloxy compounds is represented by the structural formula:

$$R_5(OCH_2Y)_p$$

where $R_5$ is a $C_2$ to $C_{12}$ aliphatic hydrocarbyl or oxahydrocarbyl radical of equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-β-methyl glucoside, and decaallyl sucrose.

Yet another group of preferred allyloxy compounds are acetals derived from allyl alcohol or methallyl alcohol and aldehydes and those derived from a polyol and an acrolein compound represented by the structural formulas:

$$R_6(CH(OCH_2Y)_2)_q \text{ and } R_7(O_2CHY)_r$$

where $R_6$ is absent or is a $C_1$ to $C_{20}$ unsubstituted or a substituted hydrocarbyl group, Y is a group as defined hereinabove and q is in the range of 2 to about 30; and where $R_7$ is a radical of molecular weight less than about 10,000 obtained by removal of at least two active hydrogens from a polyol and r is in the range of about 1 to about 170. Such compounds include 1,1,2,2-tetrakis(allyloxy)ethane, 1,1,6,6-tetrakis(allyloxy)hexane and those derived from acrolein, methacrolein or crotonaldehyde and a polyol and those derived from polyacrolein and acrolein copolymers. Exemplary are triallylidine sorbitol and the polyacrolein acetal of polyvinyl alcohol.

The more preferred allyloxy activator compounds are the polyether and polyacetal compounds in which the number of allyloxy groups per average molecule is in the range of 2 to 40 and the allyloxy equivalent is less than about 250. Most preferably the allyloxy equivalent is less than about 150.

The compositions and methods also utilize a free radical initiator. Such free radical initiator can comprise peroxides such as t-butyl hydroperoxide, cumene peroxide, methyl ethyl ketone peroxide, lauroyl peroxide, benzoyl peroxide, azo-bis(isobutyronitrile) and the like and mixtures thereof.

Depending on the end use and the application requirements it may be convenient to add any of the other conventional additives for surface coating compositions such as solvents, pigments, fillers, reinforcing agents, stabilizers, inhibitors and flow control agents. The proportions of the ingredients can vary widely depending on the compatibility of the major ingredients and the nature of the coating to be obtained. The major ingredients are advantageously selected to be compatible with one another to provide a sufficiently rapid cure of the coating and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible, a weight range of allyloxy compound to free-radical-polymerizable compound (e.g. in the range of from 70:30 to 1:99) can be used. Preferably this ratio will be in the range from 40:60 to 5:95 to provide an adequate rate of cure and an adequate level of mechanical properties in the cured coating.

In those cases where it may be desirable to provide solvent (or vehicle) for the coating composition of this invention, such solvent is preferably a volatile organic compound comprising a ketone, such as acetone, methyl ethyl ketone, methyl isobutyl ketone, etc.; an ester such as ethylene glycol monoethyl ether acetate; an aromatic such as toluene, xylene; or a mixture thereof.

The coating compositions of this invention are advantageously applied as thin films to substrates. Such films are generally cured by heating the film, e.g. in an air oven or by IR lamps, to accelerate cure to a tough, solvent-resistant coating. Exposing the film to a temperature of up to about 100° C., say between about 50° C. and 80° C., provides quite acceptable cured films. Higher temperatures can of course be utilized especially to effect curing in shorter times.

The following disclosure is provided to illustrate specific embodiments and aspects of this invention but does not imply any limitation of the scope of the invention.

MATERIALS USED

In the following described materials, the symbol "(n)" indicates a solution in the identified solvent where "n" is the weight percent of the described material in solution.

UVI(n): acrylated urethane oligomer obtained from Morton-Thiokol Company as Uvithane-893, unsaturation 0.15–0.175 equivalents/100 g; diluted with MEK to provide a solution of weight percent indicated in parenthesis, e.g. UVI(75) is 75 wt. %.

AOC: allyloxy compound, a reaction product of ethylene glycol and allyl glycidyl ether (1:10 mole ratio) in the presence of boron trifluoride/etherate catalyst at 75°–80° C. The allyl glycidyl ether is added over a period of 5 hours. The catalyst is neutralized with NaOH solution. The aqueous phase is separated from an organic phase product which is dried and filtered. The liquid organic product has a Gardner viscosity of F at 25° C. and an allyloxy equivalent of about 120.

MEK: methyl ethyl ketone

BPO: benzoyl peroxide, 10% solution in MEK.

Co(n): a cobalt catalyst compound obtained from Nuodex, Inc. as Nuocure® 10% cobalt catalyst in mineral spirits; solution diluted with MEK to weight percent indicated in parenthesis, e.g. Co(0.1) is 0.1 wt. % cobalt.

Mo(n): a solution of molybdenum (VI) dioxide bis (Ac—Ac) in a mixture of ethanol/methanol (95:5), where the weight percent molybdenum is indicated in parenthesis, e.g. Mo (0.3) is 0.3 wt. % Mo.

BYK: a mar and slip additive obtained from Mallinckrodt, Inc. as BYK-341.

EXAMPLE 1

This example serves to illustrate the effectiveness of a molybdenum compound, i.e. molybdenum (VI) dioxide bis(Ac-Ac), as a color-stabilizing, pot life-extending modifier for metal drier, i.e. a cobalt compound, in a coating composition according to this invention.

Clear coating compositions were prepared by mixing the components in the order of their listing in Table 1. "Pot life", i.e. the time for the viscosity of the composition (about 5 g.) to change from a low level, e.g. similar to water, to a high level, e.g. similar to a non-fluid gel, is measured from the time that the metal drier, i.e. the cobalt compound, is added to the composition. Films(about 0.13 mm) of each composition are applied over test specimens in accordance with ASTM Practice D3964. "Tack free time" was determined as the time from casting that the film (maintained at 65) was tack free to the touch.

"Knoop hardness number" (KHN) is determined in accordance with ASTM Standard D 1474 using a Tukon Microhardness Tester (Model 300, Page-Wilson Corp.). "Yellowing Potential", an indication of the propensity of the film to discolor, is measured as a change in $\Delta b$ color different over time, where $\Delta b$ is determined in accordance with ASTM Standard E 805 and D 2244 using a Hunter Lab Color/Difference Meter (D25D2) where the $b_o$ standard is $-0.7$.

TABLE 1

| | COATING COMPOSITIONS (parts by weight) | | | |
|---|---|---|---|---|
| Component | A | B | C | D |
| UVI(75) | 5.4 | 5.4 | 5.4 | 5.4 |
| AOC | 1.0 | 1.0 | 1.0 | 1.0 |
| BPO | 0.5 | 0.5 | 0.5 | 0.5 |
| Mo (0.29) | 0 | 0.4 | 0.8 | 1.64 |
| Co (0.23) | 0.22 | 0.22 | 0.22 | 0.22 |
| Mo/Co* | 0 | 1.6 | 3.2 | 6.4 |
| Pot Life(hours) | 2.5 | 8.2 | 56 | 73 |
| Tack Free Time, (minutes at 65°C) | 11 | 15 | 18 | 45 |
| Hardness, KHN | 10 | 7.7 | 6.7 | 3.8 |
| Yellowing Potential | 2.9 | 1.5 | 1.5 | 1.2 |

*mole ratio of molybdenum to cobalt.

EXAMPLE 2

This example serves to illustrate the effectiveness of phosphomolybdic acid (1 wt. % in ethanol) in extending the pot lift of coating compositions.

Clear coating compositions, prepared by mixing components in the order of their listing in Table 2, were evaluated for pot life. As reported the phosphomolybdic acid extended pot life from 4 to 10 hours. Films of these compositions dried to tack-free surfaces. The film comprising phosphomolybdic acid exhibited less propensity to discoloration over time than the film of the unmodified Composition E.

TABLE 2

| | COATING COMPOSITIONS (parts by weight) | |
|---|---|---|
| Component | E | F |
| UVI (75) | 5.3 | 5.3 |
| AOC | 1.0 | 1.0 |
| BPO | 1.5 | 1.5 |
| BYK | 0.06 | 0.06 |
| Phosphomolybdic Acid (1) | 0 | 0.5 |
| Co (0.1) | 0.5 | 0.5 |
| Pot Life (hours) | 4 | 10 |

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A coating composition comprising:
   (a) a free radical-polymerizable compound,
   (b) an allyloxy compound,
   (c) a metal drier catalyst,
   (d) a peroxide free radical initiator, and
   (e) a pot-life extending amount of a catalyst modifier comprising at least one molybdenum compound having a solubility in methyl ethyl ketone, ethanol or toluene of at least about 0.1 percent by weight, selected from the group consisting of molybdenum dioxide dichloride, phosphomolybdic acid and molybdenum dioxide bis(2,4-pentaneidione).

2. A composition according to claim 1 wherein the molar ratio of molybdenum compound to metal drier is about 0.1 to 10.

3. A composition according to claim 2 wherein said molybdenum compound is molybdenum dioxide bis(2,4-petanedione).

4. A composition according to claim 2 wherein said catalyst is a cobalt compound.

5. A composition according to claim 1 wherein said cobalt compound is cobalt bis(2-ethyl hexanoate).

6. A composition according to claim 1 wherein said free radical-polymerizable compound is of the formula

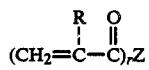

where R is selected from the group consisting of hydrogen, methyl or ethyl, where r is an integer in the range of 2 to 10 and Z is a saturated or ethylenically unsaturated residue of a polyol, a polycarboxylic acid, a polyamine, a polyepoxide or a polyisocyanate of a number average molecular weight less than about 2000 containing a hydrocarbon, polyester, polyamide, polyether or polyurethane backbone.

7. A composition according to claim 1 wherein said allyloxy compound is of the formula

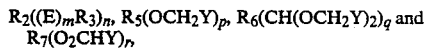

where $R_2$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

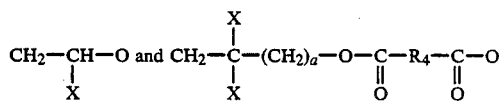

where X is selected from the group consisting of H, $CH_3, C_2H_5$ and $CH_2OCH_2Y$, Y being selected from the group consisting of

where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60; where $R_5$ is a $C_2$ to $C_{12}$ aliphatic hydrocarbyl or oxahydrocarbyl radical of equivalence p in the range of 2 to 12; where $R_6$ is absent or is a $C_1$ to $C_{20}$ unsubstituted or substituted hydrocarbyl group and q is in the range of 2 to about 30; $R_7$ is a radical of molecular weight less than about 10,000 obtained by removal of at least two active hydrogens from a polyol and r is in the range of about 1 to about 170; wherein the weight ratio of $\alpha,\beta$-ethylenically unsaturated compound to allyloxy compound is in the range of about 30:70 to about 99:1; and wherein the allyloxy compound contains from 4 to 60 allyloxy groups per molecule.

* * * * *